Aug. 12, 1958 L. F. CRABTREE 2,847,512

SECRETARIAL ANSWERING SYSTEM

Filed April 8, 1955 4 Sheets-Sheet 1

INVENTOR.
LEONARD F. CRABTREE

BY [signature]

ATTY.

Aug. 12, 1958 L. F. CRABTREE 2,847,512

SECRETARIAL ANSWERING SYSTEM

Filed April 8, 1955 4 Sheets-Sheet 2

INVENTOR.
LEONARD F. CRABTREE

BY Wm. Walter Owen.

ATTY.

SECRETARIAL ANSWERING SYSTEM

Filed April 8, 1955

INVENTOR.
LEONARD F. CRABTREE
BY Wm. Walter Owen
ATTY.

SECRETARIAL ANSWERING SYSTEM

Filed April 8, 1955 4 Sheets-Sheet 4

INVENTOR.
LEONARD F. CRABTREE
BY *[signature]*
ATTY

United States Patent Office 2,847,512

Patented Aug. 12, 1958

2,847,512

SECRETARIAL ANSWERING SYSTEM

Leonard F. Crabtree, Downers Grove, Ill., assignor to General Telephone Laboratories, Incorporated, a corporation of Delaware Application April 8, 1955, Serial No. 500,064

3 Claims. (Cl. 179—27)

This invention relates to telephone systems, but is more particularly concerned with auxiliary equipment by means of which calls to any one of a group of telephone lines may be intercepted and supervised from a common position, such as a secretary's desk. Thus, if the called party is not at his desk or is too busy to answer, the secretary will answer.

The main object of the present invention is the use of a direct line circuit between executives and their secretary, whereby if a call comes in over a P. A. X line individual to both secretary and executives, the secretary can answer the P. A. X call, and then call the executive over the direct line to see whether or not he wishes to answer the P. A. X call.

A feature of the invention is the use of a push-button type telephone, a loudspeaker answering cabinet, with the P. A. X line and the direct line terminating in these same instruments to prevent excessive use of additional equipment.

Another feature is that calls may be held on any number of lines involved, while a call is being answered on any remaining lines at a secretarial answering cabinet.

Another feature of the invention is the provision whereby the answering by an executive of a call over the P. A. X line will lock out the secretarial answering cabinet for allowing secrecy calls.

The above objects and features and others not specifically mentioned will be apparent from the detailed description, which together with the drawings constitute a preferred embodiment of the invention.

In the drawings,

Fig. 1 is a circuit diagram of an answering and holding arrangement of keys of a secretarial answering cabinet provided for a P. A. X, and direct line keys individual to direct lines.

Figure 6:
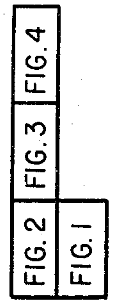

The key to the arrangement of the drawings is shown in Fig. 6.

Figure 5:
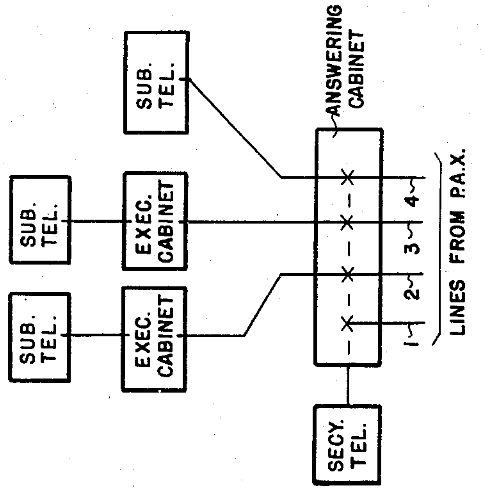
Fig. 5 is a block diagram disclosing the equipment to be served by each line.

Referring to Fig. 5, there is shown a secretarial answering cabinet with four lines terminating therein from a P. A. X or switchboard. Line 1 will be a direct P. A. X line to a ringerless type telephone for the secondary or answering cabinet attendant. Line 2 will be a P. A. X line serving an executive having a push-button type telephone 247 and an executive loudspeaker cabinet 298. Line 3 is the same as line 2. Line 4 will be a P. A. X line serving an executive having a push-button type telephone only. The executive cabinet is the same as that disclosed in the R. H. Herrick patent issued December 10, 1940. The push-button type telephone is of the type disclosed in the copending application of L. Schaufuss, Serial No. 495,182, filed March 18, 1955. All the mentioned P. A. X lines connect to the secretarial answering cabinet whereby either the secretary or the executive may answer incoming calls.

Figure 1:
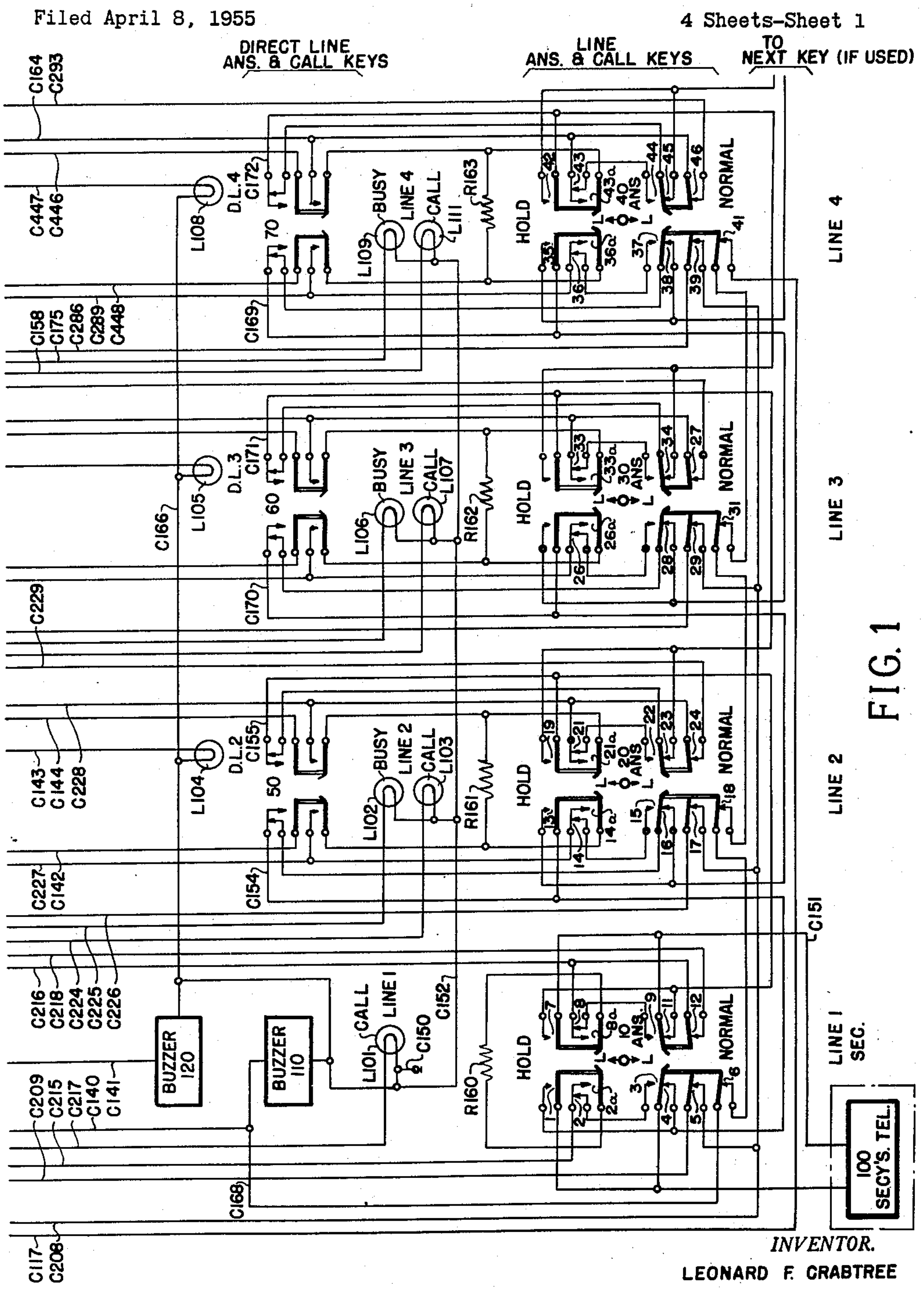

Referring now more particularly to Fig. 1 there is illustrated a secretarial answering cabinet similar to that disclosed in the B. A. Carroll Patent No. 2,541,336, issued February 13, 1951, however having direct line answer and call keys associated with each line, with the exception of line 1. Only four lines have been shown, but it is to be understood that additional lines can be added for additional service. Three position answer and call keys 10, 20, 30 and 40 are associated with each line being normally in lower position (as shown), middle position for talking, and upper position for holding. A ringerless type telephone 100 is associated with the answering cabinet, whereby the secretary or attendant can answer P. A. X calls, by operating the key associated with each line to the answer (middle) position, and to a holding position (upper) for each line for holding the line while answering a call on another line. The direct line keys 50, 60 and 70 are two positional keys, having a normal position (as shown) and an uppermost position for signalling or answering calls over the direct lines 2, 3 and 4. The buzzer 110, lamps L101, L102, L103, L106, L107, L109 and L111 are for indicating a P. A. X incoming call or a busy situation over each individual P. A. X line. The buzzer 120, direct line lamps L104, L105, and L108 are for indicating an incoming call to the attendant over a direct line.

Figure 2:
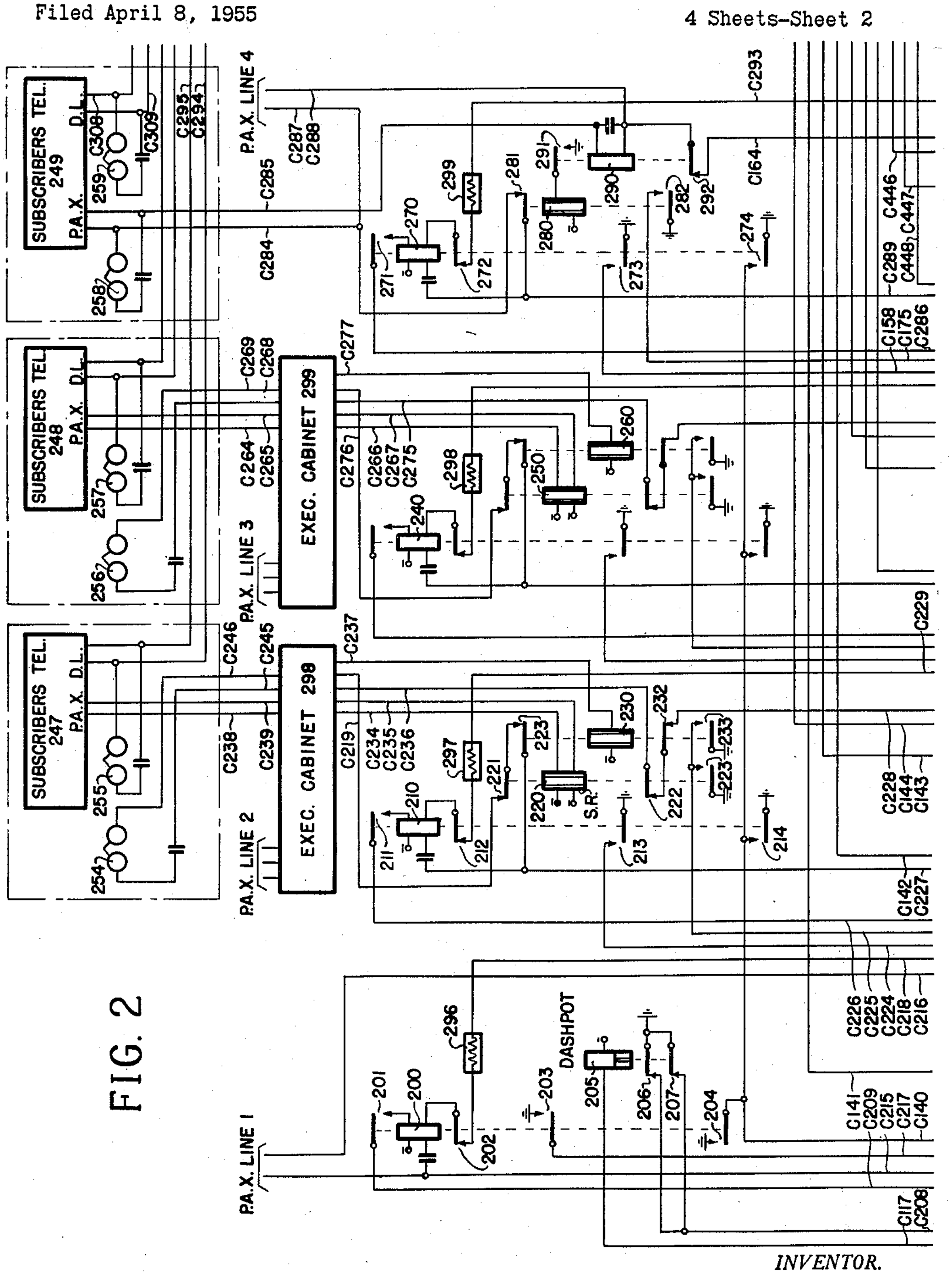
Fig. 2 is a circuit diagram of the arrangement of served equipment of each individual line.

Referring to Fig. 2 there is shown the executive's telephones 247, 248, and 249 for lines 2, 3, and 4, and executive loudspeaker cabinets 298 and 299 for lines 2 and 3. The executive cabinets as before mentioned are the type disclosed in the Herrick patent and therefore conductors C234, C235, C236, C219, C237, C238, C239, C245, and C246 will connect to the proper conductors of the Herrick patent as follows. Conductor C234 connects to the conductor connected to the armature RA693 of the relay R690 of the Herrick patent (executive loudspeaker cabinet 298). Conductor C235 connects to the contact of the R260 relay (Herrick). Conductors C236 and C246 connect at conductor C327 (Herrick). Conductor C219 and C245 connect at conductor C328 (Herrick). Conductor C237 connects to the contact of the R680 relay (Herrick). Conductors C238 and C239 connect at conductors C575 and C576 respectively (Herrick). In a similar manner the conductors C266, C267, C275, C276, C277, C264, C265, C268, and C269 connect to the executive's loudspeaker cabinet 299. The ringers 254 and 256 will replace the ringer 641 of the Herrick patent, and the pushbutton type telephones 247 and 248 will replace the telephone 600 of the Herrick patent.

I have shown the executive loudspeaker cabinet in block diagram only as its use in the present disclosure is only identical and the operations of the circuits in said cabinet to call other subscribers over direct lines as described in the Herrick patent are mostly separate and distinct from the operations of the present circuit except that a busying ground may be applied from said cabinet to certain conductors shown herein for busying purposes and the cabinet may be used alternatively with the push-button telephone to answer or initiate calls over the P. A. X lines in cooperation with the secretarial answer service shown herein.

On incoming calls from the P. A. X over P. A. X line 2 from the ringing current will be applied to the executive cabinet 298 to operate the ringer 254 over conductors 245 and 246 and is also applied over conductors 219 and C236 to operate relay 210 to signal the executive and the secretary. The secretary can answer the call via the telephone 100 by operating the key on the secretary cabinet associated with that line to the answer position. If the executive answers the call by means of his executive cabinet 298 in a manner disclosed in the Herrick patent, ground will be applied to the conductor C234 from ground on the armature RA693 on the Herrick patent, to operate the relay 220 through its upper winding to disconnect the secretary and display a signal on the secretarial cabinet that the line is being used. Should the executive answer the switchboard call by means of his telephone 247, ground would be applied on the conductor C237 from the ground on the contact of relay R680 of the Herrick patent, to operate relay 230, to also lockout the telephone 100 of the secretary. On outgoing calls to the P. A. X in a manner disclosed in the Herrick patent, ground is applied to the conductor C235 from the contact of the relay R260 of the Herrick patent to operate the relay 220 through its lower winding to lockout the secretary's telephone 100 and display a busy signal on the secretarial answering cabinet. The above-mentioned circuits will be more fully traced and disclosed in the ensuing description.

The subscriber or executive telephones 247, 248, and 249 (Fig. 2) are of the type, as before mentioned, disclosed in the L. Schaufuss copending application. This type of telephone has Hold and Answer push-buttons associated with each line, and means whereby the operation of one answer push-button of one line releases the answer push-button of another line, and holding means operated by the Hold push-buttons for holding one line while conversing over another line, and means whereby the replacement of the handset on the cradle releases any operated Hold or Answer push-button to prevent answering future calls over the wrong line. One of the lines used on this telephone will be for P. A. X calls and the other line for direct line calls to the secretarial answering cabinet, designated P. A. X and DL on the executive telephones 247, 248 and 249.

Figure 3:
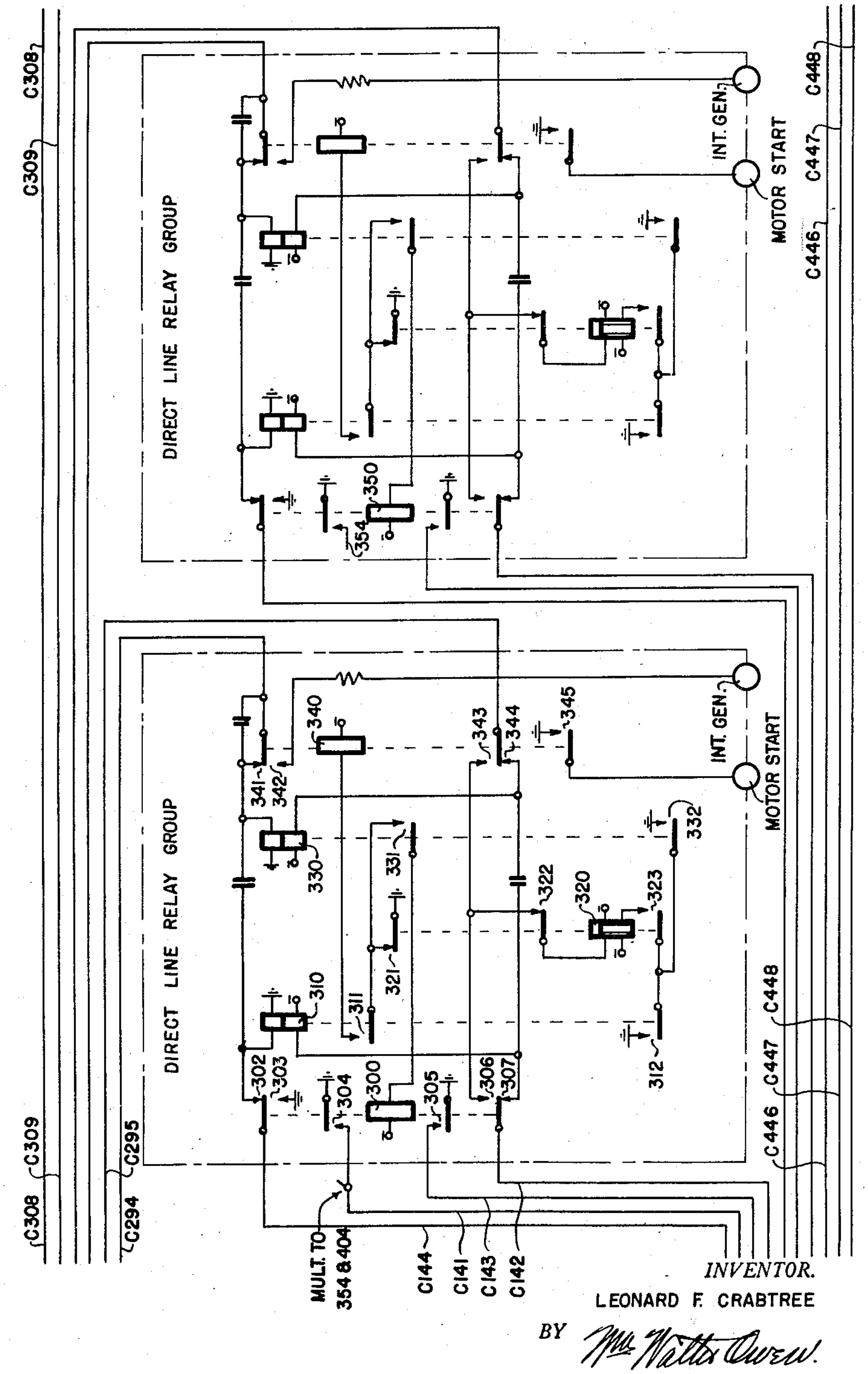
Fig. 3 is a circuit diagram of the direct line relay group for lines 2 and 3.
Figure 4:
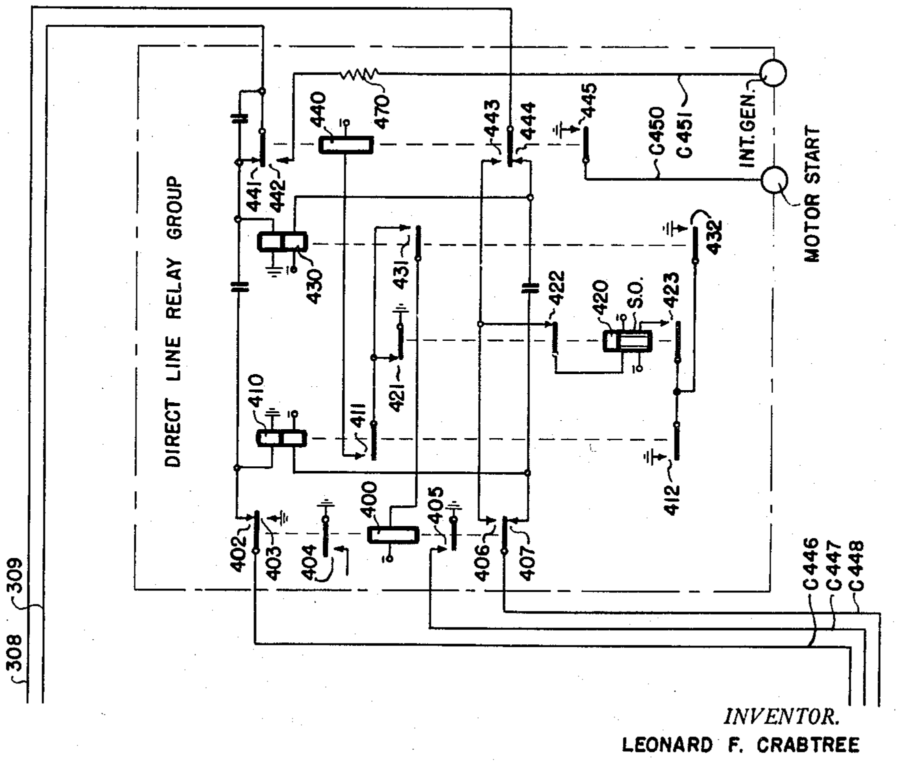
Fig. 4 is a circuit diagram of the direct line relay group for line 4.

Referring to Figs. 3 and 4 there is shown the direct line relay groups for establishing connections for conversing and signalling between the executive telephones 247, 248, and 249 and the secretary telephone 100 at the secretarial answering cabinet. These connections there-between will be more fully disclosed in the ensuing description.

Referring to Figs. 1 to 4, joined in a manner shown in Fig. 6, a full description of the invention will now be disclosed.

*Incoming P.A. X call over line 1*

On an incoming call from the P. A. X to the secretarial answering cabinet; ringing current is applied to conductor C215, through the lower winding of the line relay 200, contact 202, thermistor 296, conductor C218, contact 12 of the key 10, conductor C216 to grounded generator at the P. A. X. Relay 200 operates and at contacts 201 provides a locking circuit for itself; the circuit extending from battery, through the upper winding of relay 200, contact 201, conductor C209, contact 5 of the key 10, conductor C208, contacts 206 and 207 to ground. Contact 202 breaks to disconnect the original circuit for operating line relay 200 through its lower winding, however relay 200 remains operated through its upper winding. Contact 203 makes to operate the call lamp L101; the circuit extending from battery, conductor C150, lamp L101, conductor C217, and ground at contact 203. Operation of contact 204 operates the buzzer 110 and energizes the dashpot relay 205; the buzzer circuit extending from battery, conductor C150, buzzer 110, conductor C140, to ground at contact 204; the dashpot circuit extending from battery, winding of relay 205, conductor C117, bottom contacts of the keys of line 4, line 3, line 2, line 1, conductors C168, C140, and to ground at contact 204. The dashpot relay 205 however, will operate only after a predetermined time interval allowing sufficent time for the secretary to notice the signals operated at her answering cabinet. If the secretary does not answer the call after a predetermined time interval, the dashpot relay 205 will operate and release the line relay 200. The release of line relay 200 will release the grounded contacts extending to the buzzer 110 and the call lamp L101, thereby extinguishing them.

The operation of the key 10 of line 1 to its answering position and lifting the handset of the telephone 100 by the secretary upon noticing the signal associated therewith, will complete a circuit between the secretary's telephone 100 and the P. A. X line. The operation of the key 10 will disconnect the circuit for energizing the upper winding of the line relay 200, thereby releasing relay 200. The release of relay 200 will release contacts 203 and 204, thereby extinguishing call lamp L101 stopping the operation of buzzer 110 and disconnecting the circuit energizing the dashpot relay 205. The talking circuit now extends over conductor C215, the break contacts 2 of the key 10, contacts 13 through the secretary's telephone 100 in a well-known manner, conductor C151, contacts 9 of the key 10, the break contacts 8, conductor C216 to the P. A. X.

Upon terminating the conversation between secretary and the P. A. X caller, the secretary replaces the handset on the cradle of telephone 100 and operates the key 10 to the downward position shown in Fig. 1. The P. A. X caller will also disconnect. The purpose of thermistor 296 is to prevent false ringing due to a stored current in the condenser associated with the lower winding of relay 200.

*Incoming P. A. X call over line 2*

On an incoming P. A. X call over line 2 ringing current is applied to the ringer 254 via the executive cabinet 298 and conductors C245 and C246 in a manner previously described. This ringing current is also applied over conductor C219, contacts 221, 231, lower winding of line relay 210, contacts 212, thermistor 297, conductor C229, contacts 24 of the key 20, conductor C228, contacts 232, 222, and to ground over conductor C236. Relay 210 operates over the above mentioned circuit, and at contacts 211, relay 210 locks itself operated over a circuit extending from battery, upper winding of relay 210, conductor C226, contacts 17 (line 2), conductor C208, contacts 206 or 207 to ground. At contacts 212, the circuit energizing the relay 210 through its lower winding is disconnected, however relay 210 remains operated over its upper winding. At contacts 213 a circuit is completed for operating the call lamp L103; the circuit extending from battery, conductors C150, C152, call lamp L103, conductor C224, and contacts 213 to ground. At contacts 214 a circuit is completed for energizing buzber 110 and the dashpot relay 205; the circuit of the buzzer extending from battery, conductor C150, buzzer 110, conductor C140, to ground at contact 214; the circuit of the relay extending from battery through the winding of dashpot relay 205, conductor C117, lowermost contacts of the keys of line 4, line 3, line 2, line 1, conductors C168, C140, to ground at contacts 214. As before mentioned, the dashpot relay 205 will operate only after a predetermined time interval. The P. A. X call can now be answered by either the secretary using telephone 100 and operating the key 20 associated with the line 2, or by the executive using telephone 247 or the executive loudspeaker cabinet 298.

Should there be no response by either the secretary or the executive to the signalling after a predetermined time interval, the dashpot relay 205 will operate. Upon operation of dashpot relay 205, contacts 206 and 207 will disconnect ground from conductor C208 and thereby restore relay 210 by opening a circuit previously traced. The restoration of relay 210 will extinguish call lamp L103, stop the operation of buzzer 110, and release the dashpot relay 205.

The secretary may answer the call upon noticing the signalling associated with line 2 on the secretarial answering cabinet, by lifting the handset from the cradle of telephone 100 and operating key 20, associated with line 2 to its answer position. The operation of the key 20 disconnects the circuit for energizing relay 210, and thereby releases relay 210. The release of relay 210 restores contacts 211, 212, 213 and 214 to release the dashpot relay 205, stop buzzer 110, and extinguish call lamp L103. The circuit now extends between the P. A. X caller and the telephone 100, from the P. A. X, through the executive cabinet in a manner disclosed, conductor C219, contacts 221, contacts 231, conductor C227, break contacts 14 of the key 20 (line 2), contacts 15 of the key 20, break contacts of the direct line key 50 (line 2), conductor C154, contacts 4 of the key 10 (line 1), through the telephone 100 in a well-known manner, conductor C151, contacts 11 of the key 10 (line 1), conductor C155, break contacts of the direct line key 50 (line 2), contacts 22 of the key 20 (line 2), break contacts 21, conductor C228, contacts 232, 222, conductor C236, executive cabinet 298, and to the P. A. X.

Should the executive answer the call from the P. A. X before or after the secretary at the secretarial answering cabinet answers, the secretary will be locked out of the circuit. The executive will operate a key on his executive cabinet and answer by means of a microphone associated therewith in a manner disclosed in the Herrick patent. The operation thereof will place ground on conductor C235 to operate relay 220; the circuit extending from battery, the lower winding on relay 220, conductor C235 to ground. Operation of relay 220 opens contacts 221 and 222 to disconnect the P. A. X line from the secretarial answering cabinet. Contacts 223 operate the busy lamp L102; the circuit extending from battery, conductors C150, C152, busy lamp L102, conductor C225, to ground at contacts 223. Had the secretary not already answered the P. A. X call before the executive, relay 210 may still be operated simultaneously with relay 220 in a manner disclosed, therefore dashpot relay 205, is still energized, call lamp L103 is lit, and the buzzer 110 is operating. However, as before mentioned, the dashpot relay 205 operates after a predetermined time interval. Upon the lapse of the time interval of relay 205, it will operate and remove ground at contacts 206 and 207, and thereby restore relay 210 by opening its upper winding. The restoration of relay 210 releases the contacts controlling the operation of call lamp L103, buzzer 110, and dashpot relay 205 in a manner disclosed. The executive will therefore immediately have privacy on his line without eavesdropping of any source, including the secretary at the secretarial answering cabinet. The busy lamp L102 will remain operated until the executive terminates the call, thereby notifying the secretary that the line is being used, and indicates that the call is terminated upon being extinguished.

The executive may have answered the call on the subscriber's telephone 247 upon operating the Ans. pushbutton of the associated P. A. X line on the handset, thereby completing a circuit through the executive cabinet 298 in a manner disclosed in the Herrick patent. The completion thereof will place ground on conductor C237 to operate relay 230 over an obvious circuit. The operation of relay 230 breaks contacts 231 and 232, disconnecting the conductors C227 and C228 from the P. A. X. Contacts 233 operate the busy lamp L102 over a circuit extending from battery, conductors C150, C152, busy lamp L102, conductor C225, and to ground at contacts 233. Dashpot relay 205, relay 210, call lamp L103, and buzzer 110, may be operated simultaneously with relay 230, however after a predetermined time interval they will release in a manner disclosed. The secretary at the secretarial answering cabinet is locked out, and therefor the executive has a private line. The busy lamp L102 will remain lit until the call is terminated and ground is removed from conductor C237.

*Incoming P. A. X call over line 3*

On an incoming P. A. X call over line 3, the operation thereof will be identical with that disclosed in "Incoming P. A. X call over line 2," and need not be further described.

*Incoming P. A. X call over line 4*

On an incoming call from the P. A. X over line 4, ringing current is applied to operate ringer 258 of telephone 249 and the relay 270. One of the circuits extending over conductors C287, C284, ringer 258, conductor C285, winding of relay 290, and conductor C288. Another circuit extends from the P. A. X, over conductor C287, contact 281, conductor C289, condenser, lower winding of relay 270, contact 272, thermistor 299, conductor C293, contacts 46 of the key 40, conductor C164, contact 292, conductor C288 to the P. A. X. The ringer 258 operates to notify the executive at the telephone 249 of an existing P. A. X call. Relay 290 does not operate in this A. C. circuit. The relay 270 operates and at contact 271 locks itself operated; the circuit extending from battery, upper winding of relay 270, contacts 271, conductor C286, contacts 39 of the key 40, conductor C208, and contacts 206 and 207 to ground. Contacts 272 break, disconnecting the circuit for the lower winding of the relay 270, however, relay 270 remains operated over its upper winding. Contacts 273 complete a circuit for operating call lamp L111; the circuit extending from battery, conductor C150, conductor C152, call lamp L111, conductor C158, to contacts 273 and ground. Contacts 274 make to operate buzzer 110; the circuit extending from battery, conductor C150, buzzer 110, conductor C140, to contacts 274 and ground. Contacts 274 also complete a circuit for energizing the dashpot relay 205; the circuit extending from battery, the winding of relay 205, conductor C117, lowermost contacts of the keys of line 4—line 3—line 2—line 1, conductors C168, C140, and contacts 274 to ground. The dashpot relay 205 will not immediately operate for reasons previously stated. The call lamp L111 and the buzzer 110 operate to notify the secretary of an incoming P. A. X call.

The secretary may answer the call by lifting the handset from the cradle of the telephone 100, and operating the key 40 associated with line 4 to its answer position. The operation of the key 40 will disconnect the circuit for holding relay 270. The relay 270 releases and at contacts 273 disconnects the ground operating lamp L111. Contacts 274 releases, removing the ground for operating the buzzer 110 and the dashpot relay 205. The talking circuit now extends from the P. A. X, conductor C287, contact 281, conductor C289, contacts 36 of the key 40 (line 4), contact 37, contacts of the direct line key 70 (line 4), conductor C169, contacts 28 of the key 30 (line 3), break contacts of the direct line key 60 (line 3), conductor C170, contacts 16 of the key 20 (line 2), break contacts of direct line key 50 (line 2), conductor C154, contacts 45 of key 10 (line 1), through telephone 100 in a well-known manner, conductor C151, contacts 11 of key 10 (line 1), conductor C155, contacts of direct line key 50 (line 2), contacts 23 of key 20 (line 2), conductor C171, break contacts of the direct line key 60 (line 3), contacts 34 of key 30 (line 3), conductor C172, break contacts of the direct line key 70 (line 4), contacts 44 of the key 40 (line 4), break contacts 43, conductor C164, contacts 292, and conductor C288 to the P. A. X. Conversation may now take place therebetween. Upon termination of the call, the relays, etc. will release in a manner similar to the other lines.

The executive may answer the P. A. X call over line 4 prior to or after the secretary has answered, by lifting the telephone from the cradle and operating the Ans. push-button associated with P. A. X line on the subscriber telephone 249. The answering thereof, will stop the ringing of the ringer 258 in a well-known manner, and complete a direct current circuit to operate relay 290; the circuit extending from the P. A. X, conductors C287, C284, the telephone 249 in a well-known manner, conductor 285, winding of relay 290, conductor C288 to the P. A. X. Operation of relay 290 at contacts 291, completes a circuit for energizing relay 280 over an obvious circuit. At contact 292 a circuit is opened between the secretary and the P. A. X. The operation of relay 280 at contacts 281, opens a further circuit between the secretary and the P. A. X. At contacts 282, a circuit is completed for energizing busy lamp L109; the circuit extending from battery, conductors C150, C152, busy lamp L109, conductor C175, and contacts 282 to ground, thereby notifying the secretary at the secretarial answering cabinet that the executives P. A. X line is busy, and indicating termination upon the extinguishment thereof.

*Holding a P. A. X call and the use of the direct line by the secretary*

It is customary in large manufacturing concerns that an executive may not wish to be disturbed by incoming P. A. X calls, and thereby notifies the secretary of this. However, the executive may want to be informed of calls only of utmost importance.

It will be assumed that the secretary is conversing over her P. A. X line (line 1) in a manner disclosed and that simultaneous P. A. X calls come in over lines 2 and 4. It will be assumed that the executives associated with these lines do not wish to be disturbed by P. A. X calls other than those of extreme importance. It will be further assumed that these calls are to be of extreme importance to the executives being called.

The secretary upon noticing the signalling corresponding to lines 2 and 4, notifies the party calling over line 1 to hold on, and operates the key 10 to its hold position. The operation of the key 10 places the resistor R160 in bridge of the conductors C215 and C218. The resistor R160 holds the line by preventing disconnection of the P. A. X call.

We will assume that the secretary answers the P. A. X call on line 2 and notifies the party calling to hold on, and operates the key 20 (line 2) to its hold position to hold line 2 in a manner identical to line 1.

The secretary will then operate the key 40 of line 4 and complete a previously described circuit between the P. A. X caller and the secretary via telephone 100. Upon the notification of an important caller, the secretary notifies the caller to hold on, and manually operates the key 40 of line 4 to its hold position to hold the line. The secretary will then proceed to call the executive associated with line 4 via the direct line. The direct line key 70 of line 4 is manually operated to its call position to signal the executive's telephone 249. A circuit is thereby completed to operate relay 410 (Fig. 4) of the direct line relay group; the circuit extending from battery, lower winding of relay 410, contacts 407, conductor C448, make contacts of the direct line key 70 (line 4), conductor C169, contacts 28 of key 30 (line 3), break contacts of direct line key 60 (line 3), conductor C170, contacts 13 of key 20 (line 2), conductor C154, contact 1 of key 10 (line 1), through telephone 100 in a well-known manner, conductor C151, contacts 7 of key 10 (line 1), contacts 19 of key 20 (line 2), conductor C171, break contacts of direct line key 60 (line 3), contacts 34 of key 30 (line 3), make contacts of direct line key 70 (line 4), conductor C446, contact 402, upper winding of relay 410 to ground. The operation of relay 410 at contact 411 completes a circuit for energizing relay 440; the circuit extending from battery, contacts 411, 421 to ground. At contact 412, relay 410 prepares a circuit for energizing the relay 420 through its lower winding. The operation of relay 440 at contact 441 breaks the circuit for relay 430 and, at contacts 442 a circuit is completed for sending impulses of alternating current to the ringer 249 via the interrupted generator in a manner to be disclosed. At contact 443, relay 440 prepares a circuit for the ring cut off relay 420. At contacts 445, an obvious circuit is completed for starting the motor of the interrupted generator. The starting of the motor operates the generator in a well-known manner sending impulses of alternating current over conductor C451, resistor 470, contacts 442, conductor C309, through the condenser and ringer 259, conductor C308, contacts 443, 422, the upper winding of relay 420 to battery. The ring cut off relay 420 will not operate on ringing impulses over the above traced alternating current circuit including the condenser.

Upon the executive noticing the signal of his direct line ringer 259, he will depress his direct line Ans. push-button (D. L.) and remove the handset from the cradle of the telephone 249 to stop the ringing. The circuit now extends from battery, upper winding of relay 420, contacts 422, 443, conductor C308, through the direct current circuit through the telephone 249 in a well-known manner, conductor C309, contacts 442, resistor 470, to ground potential on the interrupter generator. Relay 420 operates, contacts 421 open to remove ground for energizing relay 440, whereby relay 440 restores. Contacts 422 open to open the circuit for energizing relay 420 through its upper winding, however at contacts 423, relay 420 completes a circuit for maintaining itself operated; the circuit extending from battery, lower winding of relay 420, contacts 432 and 412 to ground. The release of relay 440 opens contacts 442, 443 and 445, to disconnect the circuit for sending impulses to the ringer 259; disconnect the circuit energizing the motor, and extinguishing the direct line lamp L108. The interrupted generator is therefore deenergized. At contacts 441 and 444 a circuit is now completed for energizing line relay 430; the circuit extending from battery, lower winding of relay 430, contacts 444, conductor C308, through the telephone 249 in a well-known manner, conductor C309, contacts 441, upper winding of relay 430 to ground. The operation of relay 430 at contacts 431 prepares a circuit for energizing relay 400. At contact 432 an added ground is applied to relay 420 over an obvious circuit.

A conversing circuit now extends between the secretary at telephone 100 and the executive at telephone 249; the circuit extending from telephone 100, conductor C151, contacts 7 of key 10 (line 1), conductor C155, contacts 19 of key 20 (line 2), conductor C171, break contacts of direct line key 60 (line 3), contacts 34 of key 30 (line 3), conductor C172, make contact of direct line key 70 (line 4), conductor C446, contacts 402, 441, conductor C309, through telephone 249, conductor C308, contacts 444, 407, conductor C448, make contact of direct line key 70 (line 4), conductor C169, contacts 28 of key 30 (line 3), break contact of direct line key 60 (line 3), conductor C170, contacts 13 of key 20 (line 2), conductor C154, contacts 1 of key 10 (line 1), and back to telephone 100.

Upon the executive on telephone 249 being notified of the important existing P. A. X call, he will press the Ans. push-button associated with the P. A. X line, thereby restoring the Ans. push-button on the Ans. push-button of the direct line in a manner disclosed in the Schaufuss copending application. The executive answers the P. A. X call in a manner previously described.

The restoration of the Ans. push-button of the direct line of telephone 249 opens the previously mentioned circuit for energizing the line relay 430, thereby opening contacts 431 and 432. The secretary at the secretarial answering cabinet restores the direct line key and the key 40 of line 4 into a position as shown in Fig. 1. The restoration of the direct line key opens the previously traced circuit for energizing relay 410. The relay 410 restores, opening contacts 411 and 412. The opening of contacts 411 disconnects the prepared circuit for relay 440. At contact 412 the ground is removed for the lockup circuit for energizing relay 420. Relay 420 restores and contacts 421, 422 make and contacts 423 break to prepare for future calls.

It will be recalled that a P. A. X call was also being held on line 2 by the secretary at the secretarial Ans. cabinet. A call to the executive over the direct line for notifying the executive of an existing P. A. X call would then be performed in a similar related manner disclosed above respective to line 4, however operating through the direct line relay group (Fig. 3) associated with line 2.

It will also be recalled that an existing P. A. X call was being held over line 1. The secretary may now operate the key 10 to its middle or answer position on the secretarial answering cabinet, and resume conversation with the P. A. X party via telephone 100 over a circuit previously described.

Upon termination of the described P. A. X calls, the equipment related thereto will restore in a manner previously described.

It is to be understood that although only three assumed P. A. X calls were used as examples, any combination of incoming P. A. X calls could be handled in a similar manner by the secretarial answering cabinet.

*An executive calling the secretary via the direct line*

It will be assumed that an executive at the telephone 247 (line 2) will make a call via the direct line to the secretary, and shortly thereafter, the executive at the telephone 247 receives a P. A. X call before completing conversation with the secretary. Further assumptions will also be made in the ensuing description.

The executive at telephone 247 will lift up the handset thereon, and operate the Ans. push-button associated with the direct line (D. L.). Upon doing so, a circuit is completed for energizing the direct line relay 330; the circuit extending from battery, lower winding of relay 330, contacts 344, conductor C295, through the telephone 247, conductor C294, contacts 341, the upper winding of relay 330 to ground. The relay 330 operates and at contacts 331 completes a circuit for energizing relay 300; the circuit extending from battery, the winding or relay 300, contacts 331, 321, and to ground. At contact 332, relay 330 prepares a circuit for holding the ring cut off relay 20 through its lower winding. Relay 300 operates and at contacts 301, a circuit is prepared for operating relay 310. Contacts 304 make to operate buzzer 120; the circuit extending from battery, conductor C150, through buzzer 120, conductor C141, and contacts 304 to ground. Contacts 305 make to light the direct line lamp L104; the circuit extending from battery, conductors C150, C166, L104, conductor C143, and contacts 305 to ground. Contacts 303 and 306 make to prepare a circuit for energizing the relay 320 through its upper winding.

Upon noticing the buzzer 120 and the lamp L104 associated with line 2, the secretary lifts the handset of telephone 100 and operates the direct line key 50 to its operated position. The operation thereof, completes a circuit for energizing the slow-to-operate relay 320; the circuit extending from battery, upper winding of relay 320, contacts 322, 306, conductor C142, make contact of direct line key 50 (line 2), conductor C154, contacts 4 of key 10 (line 1), through telephone 100, conductor C151, contacts 11 of key 10 (line 1), conductor C155, make contact of direct line key 50 (line 2), conductor C144, and contacts 303 to ground. Relay 320 operates after a short interval, contacts 321 break to remove the ground for energizing relay 300. The relay 300 thereby deenergizes. At contacts 322 the circuit for energizing the relay 320 over its upper winding is opened, however, at contacts 323 a circuit is completed for locking the relay 320 operated; the circuit extending from battery, the lower winding of relay 320, contacts 323, and contacts 332 to ground. The deenergization of relay 300 opens contacts 301, 303, 305, and 306 to thereby disconnect the buzzer 120 and extinguish the lamp L104. Contacts 302 and 307 make to complete a circuit for energizing the relay 310; the circuit extending from battery, lower winding of relay 310, contacts 307, conductor C142, make contact with direct line key 50 (line 2), conductor C154, contacts 4 of key 10 (line 1), through telephone 100, conductor C151, contacts 11 of key 10 (line 1), conductor C155, make contact of direct line key 50 (line 2), conductor C144, contacts 302, upper winding of relay 310 to ground. The operation of relay 310 at contacts 311, prepares a circuit for energizing relay 340. At contacts 312 a second ground is applied to the lower winding of relay 320 insuring its operation.

A conversing circuit now extends between the executive's telephone 247 and the secretary's telephone 100; executive telephone 247, conductor C295, contacts 344, 307, conductor C142, make contact of direct line key 50 (line 2), conductor C154, contacts 4 of key 10 (line 1), through telephone 100, conductor C151, contacts 11 of key 10 (line 1), conductor C155, make contact of direct line key 50 (line 2), conductor C144, contacts 302, 341, conductor C294 to telephone 247.

As before mentioned, it will be assumed now that the executive at telephone 247 receives an incoming P. A. X call before terminating conversation with the secretary. The executive will therefore notify the secretary of the situation and tell her to hold on. The executive will then depress the Hold push-button associated with the direct line to the secretary. The depression thereof, will hold the line in a manner disclosed in the Schaufuss copending application. The executive will then depress the Ans. push-button associated with the P. A. X line on telephone 247 or answer the call on the executive cabinet 298 and operate equipment in a manner disclosed.

It will be recalled that a busy lamp will be lit on the secretarial answering cabinet during a P. A. X call to the executive (in this instance—lamp L102), therefore upon the extinguishment thereof, the secretary knows that the call has been terminated. In this instance, the secretary is then prepared to resume conversation with the executive over the direct line. The executive upon completion of the P. A. X call, again depresses the Ans. push-button of the direct line of telephone 247 and resumes conversation with the secretary.

It is to be understood that the executive could have held the P. A. X call in a similar manner by depressing the Hold push-button associated with the P. A. X line, on telephone 247 or the Hold key on the executive cabinet 298 and again depress the Ans. push-button on telephone 247 associated with the direct line to resume conversation.

Upon the completion of conversation between the executive and the secretary, the replacement of the handset on the cradle by the executive (telephone 247), breaks the circuit for energizing relay 330. The replacement of the handset on telephone 247 will restore any operated push-button in a manner disclosed in the Schaufuss application. Relay 330 restores, opening contacts 331 and 332. The opening of contact 331 breaks the prepared circuit for energizing relay 300. Contacts 332 break, removing one of the ground circuits for holding relay 320, however, relay 320 remains operated from ground at contacts 312.

The secretary can either disconnect the direct line circuit by replacing the handset on the telephone 100, or operate the direct line key downward into a position shown in Fig. 1, or both. Either operation thereof, will break the circuit for energizing relay 310. Relay 310 restores and opens contacts 311 and 312. The opening of contacts 311 breaks a prepared circuit for energizing relay 340. The opening of contacts 312 opens the circuit for holding relay 320. Relay 320 restores; contacts 321 and 322 make; contacts 323 break. Contacts 321 make to prepare future circuits for relays 300 and 340. Contacts 322 make to prepare a future operating circuit for relay 320. Contacts 323 break to disconnect a prepared circuit for energizing relay 320 through its lower winding. The relays, etc., now rest in a prepared position for future calls.

It is to be understood that direct line calls from executives at telephones 248 or 249 to the secretary can be made in a similar manner disclosed above over a direct line relay group associated with these executives. However, it is to be pointed out that contacts 354 of relay 350 and contacts 404 of relay 400 are multiplied to conductor C141 at the designated place shown in Fig. 3 for operating buzzer 120 during direct line calling to the secretary by the executives.

An executive may signal the secretary over the direct line regardless whether or not a P. A. X call intended for him or any other line already is being answered or held by the secretary. This situation may occur due to the executive being curious as to who is attempting to call him upon having noticed the signal associated with his line, but did not attempt to answer the call immediately.

*Outgoing P. A. X call over line 1*

On an outgoing P. A. X call over line 1, the secretary lifts the handset from telephone 100, and operates key 10 to its answer position. A circuit is now completed between the telephone 100 and switchboard or P. A. X equipment; the circuit extending from telephone 100, conductor C151, contacts 9 of key 10, contacts 8, 8*a*, conductor C216, through the switchboard or P. A. X, conductor C215, break contacts 2, contacts 3, and back to telephone 100. The secretary if connected to an operator at the switchboard merely notifies her of the desired number wanted, etc., to complete the call. However, should a P. A. X exist, a dialling device could be provided on telephone 100 and the desired party's number could be dialled over the traced circuit in a well-known manner.

*Outgoing P. A. X calls over lines 2, 3 and 4*

The procedure for making outgoing P. A. X calls over lines 2, 3 or 4 is similar to that disclosed in relation to line 1.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system having a plurality of telephone lines connected to an exchange, a secretarial answering position including a secretary's telephone and a plurality of keys each individual to one of said lines, a signal on each line and a signal at the secretary's telephone individual to each line, means responsive to the receipt of an incoming call from the exchange for operating the signal on the called one of said lines and for operating the corresponding signal at the secretary's telephone, means responsive to the operation of a key at the telephone or the key at the secretary's telephone for answering the call, a second key at the secretary's telephone for each line, a plurality of direct line links, each of said second keys connecting one of said direct line links to the secretary's telephone when operated, means responsive to the operation of one of said last keys when operated by the secretary for signalling the subscriber on the associated line over the associated link, means controlled by the response of the subscriber on said last line for completing a connection to the secretary's telephone over said link, and means controlled by the subscriber on said line for disconnecting the connection to the secretary's telephone and establishing a connection to the associated exchange line and thereby preventing any connection between the secretary's telephone and the calling line.

2. In a telephone system having a plurality of telephone lines connected to an exchange, a secretarial answering position including a secretary's telephone and a plurality of keys each individual to one of said lines, a signal on each line and a signal at the secretary's telephone individual to each line, means responsive to the receipt of an incoming call from the exchange for operating the signal on the called one of said lines and for operating the corresponding signal at the secretary's telephone, means responsive to the operation of a key at the telephone or the key at the secretary's telephone for answering the call, a second key at the secretary's telephone for each line, a plurality of direct line links each connecting one of said direct line links to the secretary telephone when operated, a second signal on each line and a second signal at the secretary's position individual to each direct line link, a plurality of line relays individual to each direct line link, certain of said relays operated responsive to the operation of said last keys when operated by the secretary for the operation of the second signal of the subscriber on the associated line over the associated link, certain of said relays operated responsive to the operation of a second key at said subscribers telephone for operating the second signal at the secretary position over the associated link, one of said relays operated responsive to the party being signalled answering over the direct line link, and means controlled by subscriber on said line for disconnecting the connection to the secretary's telephone and establish a connection to the associated exchange line and thereby preventing any connection between the secretary's telephone and the calling line.

3. In a telephone system having a plurality of telephone lines connected to an exchange, a secretary's answering position including a secretary's telephone and a plurality of keys each individual to one of said lines, a signal on each line and a signal at the secretary's telephone individual to each line, means responsive to the receipt of an incoming call from the exchange for operating the signal on the called one of said lines and for operating the corresponding signal at the secretary's telephone, means responsive to the operation of a key at the telephone or the key at the secretary's telephone for answering the call, a cutout relay interconnecting each telephone line and said secretarial answer position, a second key at the secretary's telephone for each line, a plurality of direct line links, each of said second keys connecting one of said direct line links to the secretary's telephone when operated, means responsive to the operation of one of said last keys when operated by the secretary for signalling the subscriber on the associated line over the associated link, means controlled by the response of the subscriber on said last line for completing a connection to the secretary's telephone over said link, said cutout relay disconnecting the connection to the secretary's telephone responsive to the subscriber answering the call over said telephone line to establish a connection to the associated exchange line and thereby preventing any connection between the secretary's telephone and the calling line.

References Cited in the file of this patent

UNITED STATES PATENTS

| | | |
|---|---|---|
| 1,741,639 | Lomax | Dec. 31, 1929 |
| 1,756,102 | Rosekras | Apr. 29, 1930 |
| 1,890,479 | Wallace | Dec. 13, 1932 |
| 2,249,156 | Merrill | July 15, 1941 |

OTHER REFERENCES

Bell Laboratories Record: July 1930, vol. 8, No. 11, pages 527–530; August 1937, vol. 15, No. 12, pages 370–376; June 1940, vol. 18, No. 10, pages 315–318.